Nov. 3, 1931.  H. A. HAYDEN  1,830,027

METHOD OF MAKING BLANKS

Filed Feb. 17, 1930

INVENTOR.
Howard A. Hayden
BY
Francis D. Hardesty
ATTORNEY.

Patented Nov. 3, 1931

1,830,027

UNITED STATES PATENT OFFICE

HOWARD A. HAYDEN, OF DETROIT, MICHIGAN

METHOD OF MAKING BLANKS

Application filed February 17, 1930. Serial No. 428,936.

This invention relates to methods of making blanks and more particularly to methods of making screw blanks, tapered pins, bolts, and the like, wherein the ratio of the length to the diameter is in the neighborhood of 8 to 1.

Heretofore in the manufacture of blanks having the above dimension ratio, it has been the practice to support the work at one end in a rotating chuck and at the other end in a stationary tail center. A forming or cutting tool, having an extremely narrow cutting edge, was applied to the work and the tool traveled, as in a lathe, along the axis of the work in order to cut the latter from one end to the other.

In the manufacture of blanks having a length to diameter ratio of no more than two and one half or three to one, it has been found feasible to support the work at one end in a rotating chuck, leaving the other end free, and to use a broad faced cutting tool, the blank being formed with but one heavy cut, the face of the tool being as broad as the total cut or forward portion of the work. This method, while useful for short or stubby blanks, cannot be used successfully for blanks whose length to diameter ratio is 8 or 10 to 1, since the free or unsupported end will not remain in alignment with the chuck, due to the great load applied to the work when a single broad cut is taken.

It is an object of the present invention, therefore, to provide a method of forming blanks whose length to diameter ratio is as high as about 8 or 10 to 1, said method of forming blanks including the steps of supporting the work at both ends (rather than at one end) in rotating chucks, and bringing to the work, a broad faced forming tool, one that travels transversely of, but does not move along, the longitudinal axis of the latter.

Figure 1:
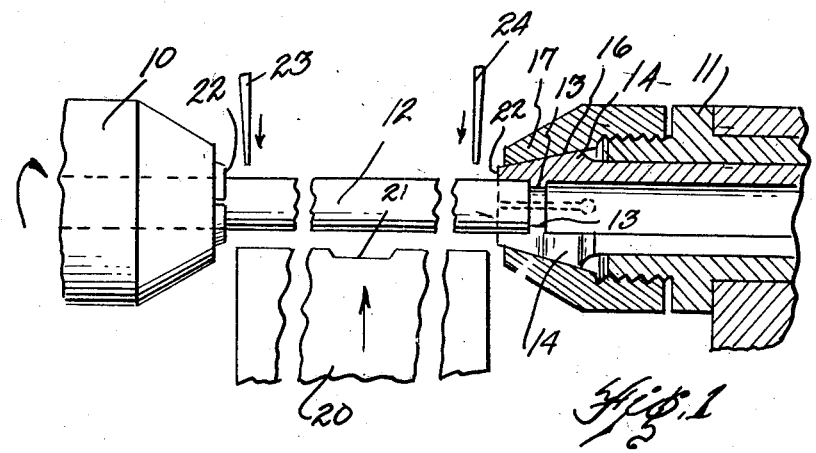
Figure 2:
Figure 3:
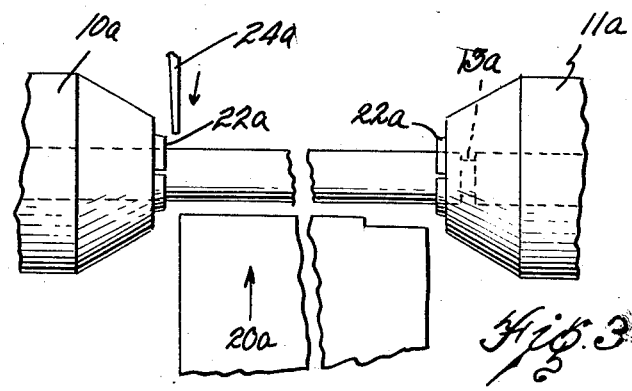
Figure 4:
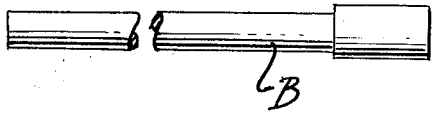

Other objects will readily occur to those skilled in the art upon reference to the following description and the accompanying drawings in which Figs. 1 and 3 are plan views of machines for carrying out the present process, and Figs. 2 and 4 are samples of blanks made by the present process.

Referring to the drawings, rotating chucks 10 and 11, which may be the rotating chucks of a screw machine, support and grip the work 12 at both ends of the latter. In the instance shown, the work is intermittently fed thru the hollow head chuck 10 and towards the hollow tail chuck 11 where it abuts the stop 13 in the collet jaws 14, these last being spaced apart, as shown, for a portion of their length to form resilient clamps, tapered portions 16 thereof cooperating with the inwardly tapered wedge nut 17 so as to be forced into gripping engagement with the work when the parts are brought together in the usual manner.

A broad faced forming tool 20 whose edge is formed as at 21 to conform to the peripheral contour of the finished blank 19 is applied to the work by moving it transversely thereof and towards the axis of rotation of the latter. The tool is broad enough to occupy substantially the entire distance between the faces 22 of the collet jaws 14, in the chucks 10 and 11, and is at least broad enough to do all of its cutting without being moved longitudinally or axially of the work, except in special instances where a broad faced tool is moved in this direction, after it has already taken a broad cut. Then cutting off tools 23 and 24 are brought to work, as shown.

When the work has been formed or cut to the desired shape, the finished piece or blank drops into the receiving bin and the portion between the cutting off tool 24 and the stop drops out of the chuck 11 when the collet jaws 14 are released. The chuck 10 is then loosened in a similar manner and the work is fed towards the tailchuck 11, where it is seized by the latter, the end of the work abutting the stop so as to be ready for a repeated blank-forming operation.

In the method disclosed by Fig. 3, the work 12a which will be when formed, of the shape shown by Fig. 4 at B, is cut off, after having been formed by the forming tool 20a, at the point where the cutting off tool 24a intersects the axis of the work, the portion between the cutting off tool 24a and the stop 13a, forming the entire blank. In this method only one cutting off tool is used since the portion in the chuck 11a forms part of the finished product.

It will be seen that I have provided a method for manufacturing blanks whose ratio of length to diameter is substantially greater than the similar dimension ratio of blanks heretofore made by broad faced forming tools. It will also be seen that I have provided a method in which movement of the work in respect to the chucks during forming or cutting is entirely eliminated as the chucks are so formed as to grip the work at both ends.

Now having described the invention and the preferred embodiment thereof, it is to be understood that the said invention is to be limited not to the specific details herein set forth, but only by the scope of the claims which follow:

Claims:—

1. The process of forming blanks from rod or bar stock in a machine having axially immovable chucks separated from each other by a distance substantially equal to the length of the finished piece, which comprises feeding the stock thru one of said chucks towards the other, gripping and supporting the work at both ends in said chucks, rotating both of said chucks forming the work by bringing a broad-faced forming tool to the work between the chucks, thereafter cutting off the completed work by bringing a cutting off tool to the work between the chucks and ejecting between the chucks that which is gripped in the second of the chucks by loosening the jaws thereof, all the while the second chuck is axially immovable.

2. The process of forming blanks from rod or bar stock in a machine having axially immovable chucks separated from each other by a distance substantially equal to the length of the finished piece, which comprises feeding the strock thru one of said chucks towards the other, gripping and supporting the work at both ends in said chucks, rotating both of said chucks, forming the work by bringing a broad-faced forming tool to the work between the chucks, thereafter cutting off the completed work between the chucks and ejecting between the chucks that which is gripped in the second of the chucks by loosening the jaws thereof all the while the second chuck is axially immovable.

3. The process of forming blanks from rod or bar stock in a machine having axially immovable chucks separated from each other by a distance substantially equal to the length of the finished piece, which comprises feeding the stock thru one of said chucks towards the other, gripping and supporting the work at both ends in said chucks, rotating both of said chucks, forming the work by bringing a broad faced forming tool to the work between the chucks, the forming tool spanning substantially the entire unsupported portion of the work, thereafter cutting off the completed work between the chucks and ejecting between the chucks that which is gripped in the second of the chucks by loosening the jaws thereof, all the while the second chuck is axially immovable.

4. The process of forming blanks whose finished length to diameter ratio is about 8 to 1, from rod or bar stock in a machine having axially immovable chucks separated from each other by a distance substantially equal to the length of the finished piece, which comprises feeding the stock thru one of said chucks towards the other, gripping and supporting the work at both ends in said chucks, rotating both of said chucks, forming the work by bringing a broad faced forming tool to the work between the chucks, thereafter cutting off the completed work between the chucks and ejecting between the chucks that which is gripped in the second of the chucks by loosening the jaws thereof, all the while the second chuck is axially immovable.

HOWARD A. HAYDEN.